Reissued Mar. 9, 1948

Re. 22,983

UNITED STATES PATENT OFFICE 22,983

MANUFACTURE OF DYESTUFFS

Norman Hulton Haddock, Blackley, Manchester, England, assignor to Imperial Chemical Industries Limited, a corporation of Great Britain No Drawing. Original No. 2,368,658, dated February 6, 1945, Serial No. 443,670, May 19, 1942. Application for reissue September 17, 1947, Serial No. 774,663. In Great Britain May 23, 1941

8 Claims. (Cl. 260—127)

The present invention relates to the manufacture of dyestuffs and intermediates therefor.

According to the invention I tetrazotise a diamino-p:p'-di-(6-methylbenzthiazyl) azobenzene which has been made as described below, and cause the resulting tetrazo compound to react with an alkyl xanthate or an alkali metal thiocyanate, thereby obtaining the corresponding dixanthato- or dithiocyano-p:p'-di-(6-methylbenzthiazyl) azobenzene.

The invention also comprises the step of hydrolysing a dixanthato- or dithiocyano-p:p'-di-(6-methylbenzthiazyl) azobenzene obtained in the above manner, to the corresponding dimercapto-p:p'-di-(6-methylbenzthiazyl) azobenzene and oxidising the latter to the corresponding polydisulphide.

The present polydisulphides represent sulphur-containing dyestuffs which may be applied to cellulosic material from sodium sulphide according to the usual practice with sulphur dyestuffs. By this means there are obtained bright orange-yellow shades possessing excellent fastness to severe washing, chemick and light.

The dixanthato and dithiocyano derivatives of p:p'-di-(6-methylbenzthiazyl) azobenzene referred to above, not only constitute intermediates in the described manufacture of sulphur-containing dyestuffs, but may themselves be applied to cellulosic material from sodium sulphide solution according to the usual practice with sulphur dyestuffs. By this procedure the dixanthato and dithiocyano derivatives become hydrolysed in the sodium sulphide solution to the corresponding dimercapto derivatives. The latter subsequently become oxidised to polydisulphides on the fibre. Thus by the dyeing technique commonly employed with sulphur dyestuffs there are produced on the fibre the same sulphur dyestuffs, to the production in substance of which the above-mentioned processes relate. In this way also, dyeings are obtained having the properties already described.

Accordingly, this invention is to be regarded as relating not only to the manufacture by the aforesaid processes of sulphur-containing dyestuffs in substance, but also to their production on the fibre, that is on the cellulosic material directly, by employing in the technique usual in dyeing with sulphur dyestuffs, the above intermediate products, namely the dixanthato and dithiocyano derivatives of p:p'-di-(6-methylbenzthiazyl) azobenzene.

The starting material which is a diamino p:p'-di-(6-methylbenzthiazyl) azobenzene, is made either (*a*) by oxidising nitro-dehydrothio-p-toluidine (nitro-6-methyl-2-p-aminophenylbenzthiazole; see German specification No. 81,711) for example, in solution in ethylene glycol monoethyl ether with sodium hypochlorite, and reducing the resulting dinitro-p:p'-di-(6-methylbenzthiazyl)-azobenzene with e. g. sodium sulphide, or (*b*) by nitrating p:p'-di-(6-methylbenzthiazyl) azobenzene, obtained by the oxidation of dehydrothio-p-toluidine, and reducing the dinitro-p:p'-di-(6-methylbenzthiazyl) azobenzene thus obtained.

By alkyl xanthate (also to be referred to as alkyl xanthogenate or alkoxy dithioformate) I mean a salt of an alkyl derivative of xanthic or xanthegenic acid, for example, the ethyl derivative. The latter itself is often called more briefly xanthic or xanthogenic acid. Thus, I may employ, for instance, as alkyl xanthate, potassium ethyl xanthate or xanthogenate or potassium isopropylxanthate. As an alkali metal thiocyanate there may be used in accordance with the invention, for example, sodium or potassium thiocyanate.

The following examples in which the parts are by weight illustrate but do not limit the invention.

*Example 1*

16 parts of diamino-p:p'-di-(6-methylbenzthiazyl) azobenzene (made as described below) are dissolved in 230 parts of concentrated sulphuric acid at 20° C. A solution of 4.8 parts of sodium nitrite in 50 parts of concentrated sulphuric acid is added and the mixture stirred at 20° C. for ¼ hour. The resulting solution is now poured on to 950 parts of a mixture of ice and water, 10 parts of sodium thiocyanate dissolved in the minimum quantity of water are added and the mixture is stirred and heated up to 80° C. during ½ hour. The temperature is maintained at 80–90° C. for a further ½ hour. The yellow product in suspension is then filtered off and washed free from acid. When dry, the dithiocyano-p:p'-di-(6-methylbenzthiazyl) azobenzene so obtained forms a yellow powder which is insoluble in water but dissolves in sulphuric acid with a red color. It may be used to dye cotton in a similar manner to the polydisulphide described below.

The above dithiocyano-p:p'-di-(6-methylbenzthiazyl) azobenzene is dissolved in 400 parts of alcohol containing 40 parts of sodium sulphide (crystals). The solution is boiled for ¼ hour and diluted with 600 parts of water. The dithiocyano compound becomes thereby hydrolysed to the corresponding dimercapto compound. 200 parts of sodium chloride are added and the alcohol is then distilled off. An orange yellow precipitate consisting of polydisulphide separates. The latter is formed by oxidation of the mercapto compound by dissolved atmospheric oxygen. The precipitate is filtered off and dried in air. It forms an orange-yellow powder which is insoluble in water but dissolves in aqueous sodium sulphide, preferably containing a little alcohol or glycerol, to yield a yellowish brown solution. Cotton is dyed by this solution in shades which, after exposure to the air, are bright orange yellow and possess excellent fastness to severe washing, chemick and light.

The diamino-p:p'-di-(6-methylbenzthiazyl)-azobenzene employed above, is made as follows. 20 parts of nitrodehydro-p-toluidine are dissolved in 700 parts of boiling ethylene glycol monoethyl ether. The solution is cooled to 40° C. and 100 parts of sodium hypochlorite solution (13% available chlorine) are slowly added with good agitation at 40–45° C. The yellowish brown precipitate of dinitro-p:p'-di-(6-methylbenzthiazyl)-azobenzene is filtered off, washed with alcohol and dried. The said dinitro compound is then stirred up with 600 parts of water containing 120 parts of sodium sulphide (crystals) and boiled for 2 hours. The product in suspension is filtered off, washed with water and then with alcohol and dried to a brown powder consisting of diamino-p:p' - di - (6 - methylbenzthiazyl)azobenzene. This compound is insoluble in water and mineral acids but dissolves in concentrated sulphuric acid to a red solution.

*Example 2*

3.3 parts of diamino-p:p'-di-(6-methylbenzthiazyl) azobenzene (made as described in Example 1) (in the form of a 6.64% aqueous paste) and 110 parts of 10% aqueous sodium nitrite are cooled to 5° C. and added slowly with stirring to 50 parts of 36% hydrochloric acid at 0° C. The temperature is maintained at 0° C. during the addition. The mixture is stirred at 0° C. for ¼ hour and poured into an equal volume of a mixture of ice and water. The diazonium compound in suspension is now added slowly with good stirring to a solution of 10 parts of potassium ethyl xanthate and 20 parts of sodium carbonate in 200 parts of water at 60° C. During the addition, further amounts of sodium carbonate are added as needed in order to keep the solution alkaline to Brilliant Yellow paper. The suspension is stirred at room temperature for 1 hour and then at 80° C. for ¼ hour. The precipitate is filtered off, washed with water and acetone and dried at 80° C. It is a brown powder soluble in dilute sodium sulphide solution.

The above product (dixanthato-p:p'-(6-methylbenzthiazyl) azobenzene) is hydrolysed by boiling with 50 parts of alcohol and 5 parts of sodium sulphide (crystals) for ¼ hour. The resulting brown solution of dimercapto-p:p'-di-(6-methylbenzthiazyl) azobenzene is diluted with 200 parts of water and filtered from a trace of insoluble material. The solution is then boiled and the aforesaid dimercapto compound oxidised, by the addition of sodium m-nitrobenzene sulphonate, to give the corresponding polydisulphide. The latter is thrown down as a brown precipitate, the remaining liquor, when sufficient sodium m-nitrobenzene has been added to complete the oxidation, having turned from brown to pale yellow. (The color of the liquor is conveniently seen by spotting on filter paper and examining the runout.) The brown precipitate is then filtered off and washed with water.

Both the dixanthato compound and the polydisulphide derived from it dye cotton in yellowish orange shades from boiling aqueous sodium sulphide solutions. The shades so-obtained possess very good fastness properties particularly in respect of severe washing and chemick.

*Example 3*

3.3 parts of diamino-p:p'-di-(6-methylbenzthiazyl) azobenzene (made as described in Example 1) are diazotised with 11 parts of 10% aqueous sodium nitrite as described in Example 2. The suspension of the diazonium compound so-obtained is added slowly with stirring to a solution of 10 parts of potassium isopropyl xanthate and 20 parts of sodium carbonate in 200 parts of water at 60° C. Sodium carbonate is added as needed to keep the solution alkaline to Brilliant Yellow paper. The suspension is stirred at room temperature for 1 hour and then at 80° C. for ¼ hour. The precipitate (di-isopropylxanthato-p:p'-di-(6-methylbenzthiazyl) azobenzene is filtered off, washed with water and acetone and dried at 80° C. It is a brown powder soluble in boiling dilute sodium sulphide solution.

The above diisopropylxanthato compound is boiled with 50 parts of alcohol and 5 parts of sodium sulphide (crystals) for ¼ hour. The resulting brown solution of the corresponding dimercapto compound is diluted with 200 parts of water, and oxidised with sodium m-nitrobenzene sulphonate and the polydisulphide isolated in the manner described in Example 2.

Both the diisopropylxanthato compound and the polydisulphide dye cotton in yellow shades from sodium sulphide solutions, of very good fastness properties.

*Example 4*

4.15 parts of diamino-p:p'-di-(6-methylbenzthiazyl) azobenzene (made as described below) in the form of an 8.3% aqueous paste are diazotised with 10% aqueous sodium nitrite as described in Example 1 and the mixture then diluted with an equal volume of a mixture of ice and water. 10 parts of sodium thiocyanate dissolved in 10 parts of water are added and the mixture is stirred at 80° C. for half an hour and at 80–90° C. for a further half hour. The brownish yellow precipitate of dithiocyano-p:p'-di-(6-methylbenzthiazyl) azobenzene is filtered off and washed with water until free from acid. It dyes cotton in yellow shades from aqueous sodium sulphide solution, the shades having excellent fastness to washing and chemick.

The diamino-p:p'-di-(6-methylbenzthiazyl)-azobenzene employed above is made as follows: 9.7 parts of p:p'-di-(6-methylbenzthiazyl)azobenzene are dissolved in 55 parts of sulphuric acid (monohydrate) at 25–30° C. and 6.8 parts of potassium nitrate added slowly in small quantities, the temperature being maintained at 25–30° C. After stirring for 2 hours the temperature is raised to 60–65° C. and maintained for 2 hours. The solution is then poured onto ice and the precipitated dinitro compound filtered off and washed with water. The so-obtained dinitro-p:p'-di-(6-methylbenzthiazyl) azobenzene is reduced to the corresponding diamino compound by boiling with 300 parts of water and 60 parts of sodium sulphide (crystals) for 2 hours. When cool the brown product in suspension is filtered off, washed well with water and dried.

*Example 5*

4.15 parts of diamino-p:p'-di-(6-methylbenzthiazyl) azobenzene made as in Example 4 in the form of an 8.3% aqueous paste are diazotised with 11 parts of 10% aqueous sodium nitrite as described in Example 2. The mixture is diluted with an equal volume of a mixture of ice and water and added slowly with stirring to a solution of 10 parts of potassium ethyl xanthate and 20 parts of sodium carbonate in 200 parts of water at 60° C. Sodium carbonate is added as needed to keep the mixture alkaline to Brilliant Yellow paper. After stirring for 1 hour, the suspension is heated at 70° C. for 10 minutes, filtered and washed with water. The product (dixanthato-p:p'-di(6-methylbenzthiazyl)-azobenzene) is hydrolysed to the corresponding di-mercapto compound and then oxidised to the polydisulphide as described in Example 2.

Both the dixanthato compound and the polydisulphide dye cotton in yellow-orange shades of very good fastness properties from sodium sulphide solutions.

A similar product is obtained when the equivalent quantity of potassium isopropyl xanthate is substituted for potassium ethyl xanthate.

I claim:

1. A sulfur dye made by heating a symmetrical compound represented by the formula

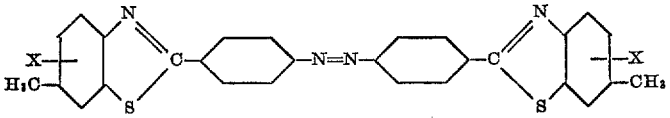

in which X is one of a group consisting of thiocyano and alkali-metal alkyl-xanthato, with sodium sulfide and water in an inert liquid organic solvent until the corresponding di-mercapto compound is formed, removing the solvent and adding an oxidizing agent until the corresponding polydisulfide is formed.

2. A sulfur dye in accordance with claim 1 wherein X is thiocyano.

3. A sulfur dye in accordance with claim 1 wherein X is alkali-metal ethyl-xanthato.

4. A sulfur dye in accordance with claim 1 wherein X is alkali-metal isopropyl-xanthato.

5. The process of making sulfur dyes which comprises heating a symmetrical compound represented by the formula

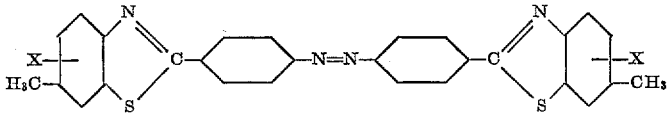

in which X is one of a group consisting of thiocyano and alkali-metal alkyl-xanthato wherein alkyl has 2 to 3 carbons, with sodium sulfide and water in a liquid inert organic solvent until the X groups are hydrolyzed to the corresponding dimercapto derivative, and then heating said compound in aqueous medium with an oxidizing agent until the corresponding polydisulfide is formed.

6. The process in accordance with claim 5 in which the organic solvent is alcohol.

7. The process in accordance with claim 5 in which oxygen is the oxidizing agent.

8. The process in accordance with claim 5 in which m-nitrobenzene sulfonate is the oxidizing agent.

NORMAN HULTON HADDOCK.